May 13, 1924.
C. A. BODDIE
Re. 15,835
ELECTRICAL MEASURING INSTRUMENT
Original Filed Sept. 21, 1915
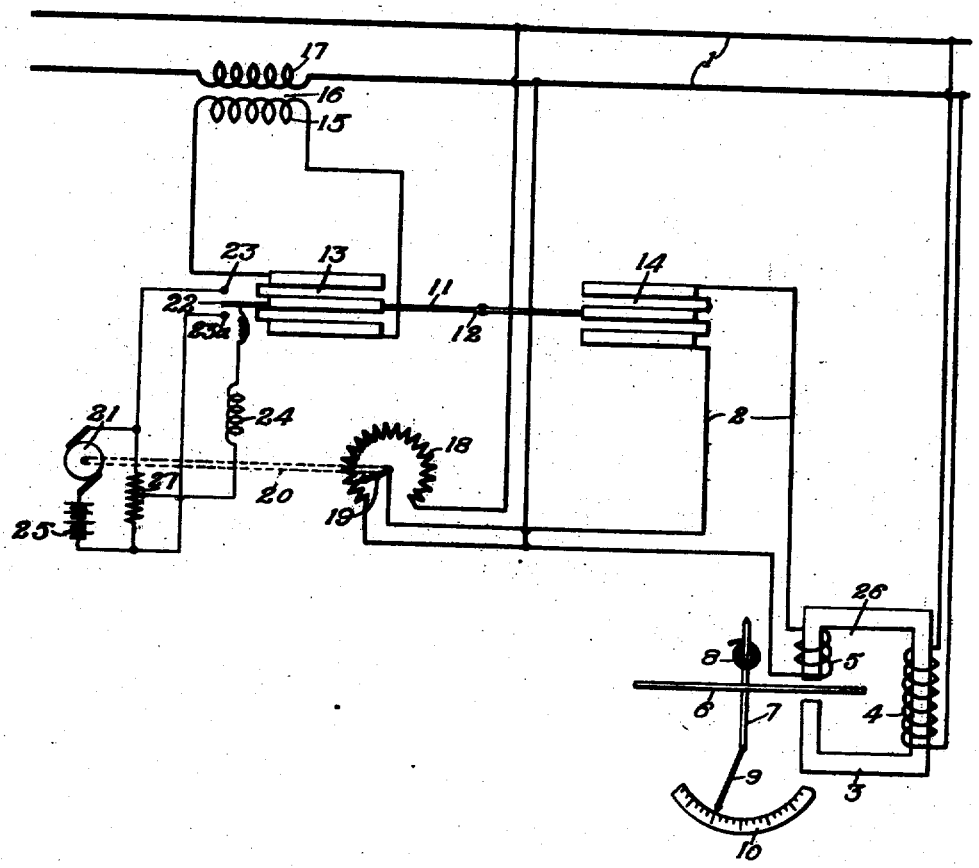
WITNESSES:
J. A. Helsel
J. A. Procter
INVENTOR
Clarence A. Boddie
BY
Wesley G. Carr
ATTORNEY Reissued May 13, 1924. Re. 15,835

UNITED STATES PATENT OFFICE.

CLARENCE A. BODDIE, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

Original No. 1,296,616, dated March 11, 1919, Serial No. 51,890, filed September 21, 1915. Application for reissue filed August 4, 1920. Serial No. 401,266.

*To all whom it may concern:*

Be it known that I. CLARENCE A. BODDIE, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments and particularly to volt-ampere meters.

The object of my invention is to provide an instrument, of the above indicated character, that is simple in construction and effective in operation.

In the carrying out of my invention, I connect the potential winding of an ordinary induction-type wattmeter to the circuit, the volt-amperes of which are to be measured, and I interpose, between the current winding of the wattmeter and the circuit, means for so controlling the current that traverses the current winding that it shall be proportional to the current traversing the circuit and shall have a predetermined phase relationship to the current traversing the potential winding, irrespective of the power factor of the circuit.

The device that is interposed between the current winding and the circuit comprises a Kelvin balance the windings on one end of which are connected in series relation to the circuit and the windings on the other end of which are connected in an auxiliary circuit comprising an adjustable resistor and the current winding. The auxiliary circuit, thus constituted, is connected in shunt relation to the main circuit. The balance is adapted to so vary the resistance of the resistor that the current winding is supplied with current which is proportional to the current traversing the circuit and has a predetermined phase relationship to the current traversing the potential winding, irrespective of the power factor of the circuit.

The single figure of the accompanying drawing is a diagrammatic illustration of an electric circuit to which is connected a volt-ampere meter embodyng my invention.

An alternating-current electric circuit 1 has a volt-ampere meter 2 connected thereto that comprises, in general, an electro-responsive device 26, a Kelvin balance 11, a resistor 18 and a motor 21.

The electro-responsive device 26 comprises a magnetizable core member 3, a potential winding 4 that is operatively connected to the circuit 1, a current winding 5 and an armature 6 that is mounted on a shaft 7. The shaft 7 is biased toward a predetermined position by a spring 8 and has a pointer 9 mounted thereon that co-operates with a scale 10 to indicate the deflections of the armature 6. The Kelvin balance 11 is provided with a movable member 12 and two sets of windings 13 and 14, and is interposed between the current winding 5 and the circuit 1 in a manner hereinafter more fully set forth.

The windings 13 of the Kelvin balance are connected to the secondary winding 15 of a series transformer 16 the primary winding 17 of which is connected in series with one conductor of the circuit 1. The windings 14 are connected in a circuit comprising the current winding 5 of the electro-responsive device 26 and a resistor 18, and the circuit, thus constituted, is connected in shunt relation to the circuit 1. The resistor 18 is provided with a movable contact member 19 that is mounted on the shaft 20 of the motor 21. A movable contact member 22 is mounted on the movable member 12 of balance 11 and is adapted to engage either of two stationary contact members 23 and 23*a*. The contact members 23 and 23*a* are connected to the respective terminals of a resistor 27. The mid point of the resistor 27 is connected to one terminal of the field winding 24 of the motor 21, and the other terminal of the field winding is connected to the contact member 22. A source of electromotive force 25 is connected between one terminal of the armature of the motor 21 and one terminal of the resistor 27, and the other terminal of the resistor 27 is connected to the remaining terminal of the armature. With such an arrangement of circuits, the armature of the motor will rotate in one direction when the contact member 22 engages the stationary contact member 23 and in the opposite direction when it engages the stationary contact member 23*a*.

If current traverses the circuit 1, the balance 11 will move in a predetermined direction to effect engagement between one of the stationary contact members 23 and 23*a* and the movable contact member 22. The engagement of the contact members causes the motor 21 to rotate and the resistor 18 to be so adjusted that sufficient current is permitted to traverse the windings 14 and 5 to return the balance to its mid position. The current that traverses the winding 5 is thus proportional to the current traversing the circuit 1, but, since the circuit comprising the windings 5 and 14 and the resistor 18 is connected in shunt relation to the circuit 1, the current traversing the same will have a predetermined definite phase relationship with respect to the current traversing the winding 4. Thus, irrespective of the power factor of the circuit 1, the phase relation between the currents traversing the windings 4 and 5 is substantially definite and constant. The torque produced by the armature 6 is proportional to the product of the current in the windings 4 and 5 and, therefore, to the product of current and potential of the circuit 1.

It is a well known fact that, in order to produce a torque on the armature 6, the currents traversing the windings 4 and 5 must be out of phase with respect to each other. Consequently, the circuit, comprising the windings 5 and 14 and the resistor 18, is so proportioned that the current traversing the same bears a definite out-of-phase relation to that which traverses the winding 4. Since this phase relation is substantially constant for all power factors of the circuit 1, because the windings 4 and 5 are both connected in shunt relation to the circuit, it will be readily understood that the torque exerted on the armature 6 will be proportional to the product of two currents one of which is proportional to the potential and the other of which is proportional to the current traversing the circuit 1.

I do not limit my invention to any particular types of instruments, as many modifications may be made in the same without departing from the spirit and scope of my invention as set forth in the appended claims.

I claim as my invention:

1. A volt-ampere meter for an alternating-current circuit comprising a plurality of co-operating means energized by only one quantity of the circuit and in fixed-phase relation and means for so affecting said means as to actuate the meter in accordance with the volt-amperes of the circuit.

2. A volt-ampere meter for an alternating-current circuit comprising a movable member, actuating windings therefor energized by only one quantity of the circuit and in fixed-phase relation and means responsive to variations in another quantity of the circuit for causing the windings to actuate the movable member in accordance with the volt-amperes of the circuit.

3. A volt-ampere meter for an alternating-current circuit comprising a movable member, actuating windings therefor energized by only one quantity of the circuit and in fixed phase relation and one of which is energized in accordance with one of the factors of the apparent power of the circuit, and means for varying the magnitude of the current in another winding in accordance with the other factor of the apparent power of the circuit.

4. A volt-ampere meter for an electric circuit comprising a potential and a current winding and means interposed between the circuit and the current winding whereby the current winding is supplied with current proportional to the current that traverses the circuit and bearing a predetermined definite phase relation to the current traversing the potential winding, irrespective of the power factor of the circuit.

5. A volt-ampere meter for an electric circuit comprising co-operating potential and current windings, a Kelvin balance operatively connected to the circuit and to the current winding and means controlled by the Kelvin balance for controlling the current that traverses the current winding.

6. A volt-ampere meter for an electric circuit comprising a potential and a current winding, a Kelvin balance, the windings on one end of which are connected to the circuit to receive current proportional to the current traversing the circuit, a resistor connected in circuit with the current winding of the meter and the windings on the other end of the balance, the circuit thus constituted being connected in shunt relation to the main circuit, and means controlled by the balance for so adjusting the resistor that the current traversing the current winding is proportional to the current traversing the circuit.

7. A measuring instrument for an alternating-current circuit comprising a movable member, co-operating windings connected across the circuit for exerting a torque on the movable member and means connected to the circuit for so controlling the current traversing one of the windings that the torque exerted on the movable member will vary in accordance with the product of the current and voltage of the circuit.

8. A volt-ampere meter for an alternating-current circuit comprising a movable member, actuating windings therefor energized by only one quantity of the circuit and in fixed-phase relation, one of said windings being energized in accordance with one of the factors of the apparent power of the circuit, and means for varying the resistance of the circuit of another winding in accordance with the other factor of the apparent power of the circuit.

9. A volt-ampere meter for an alternating-current circuit comprising a movable member, windings connected in shunt relation to the circuit and means for so controlling the current traversing one of the windings that the movable member develops a torque directly proportional to the product of the current and voltage of the circuit.

10. A measuring instrument for an electric circuit comprising a winding, a Kelvin balance operatively connected to the circuit and a resistor controlled by the balance for controlling the current supplied to the winding from the circuit.

11. A measuring instrument for an electric circuit comprising a winding, a Kelvin balance operatively connected to the circuit and means controlled by the Kelvin balance for controlling the amount of current supplied to the winding from the circuit.

12. A measuring instrument for an electric circuit comprising a winding connected across the circuit, a Kelvin balance operatively connected to the circuit and means controlled by the balance for regulating the value of the current traversing the winding.

13. A volt-ampere meter for an alternating-current circuit comprising an instrument having coils one of which is directly energized from the circuit and means for supplying another coil with current from said circuit so that the meter is actuated in accordance with the apparent power traversing the circuit, and comprising a direct electrical connection between said last named coil and said circuit.

14. A volt-ampere meter for an alternating-current circuit comprising a movable member, flux-producing means therefor, means responsive to one of the quantities of the circuit and a flux-controlling device electrically associated with said quantity-responsive means and connected to the circuit and co-operating with said flux-producing means.

15. A volt-ampere meter for an alternating-current circuit comprising a movable member, voltage and current windings therefor arranged for connection to the circuit, means responsive to one of the quantities of the circuit, and a circuit-controlling device connected in series with a portion of said quantity-responsive means and between one of the meter windings and the circuit.

16. A volt-ampere meter for an alternating-current circuit comprising a movable member, voltage and current windings therefor arranged for connection to the circuit, means responsive to one of the quantities of the circuit, and a circuit-controlling device electrically connected to one of the windings of the meter, to a portion of the quantity-responsive means and to the circuit.

17. A volt-ampere meter for an alternating-current circuit comprising co-operating elements one of which is energized in proportion to one of the components of the apparent power of the circuit, means including a movable member between another of said elements and the circuit, and means including a movable member affected by only one quantity of the circuit and co-operating with said first means to energize said other element in accordance with the other component of the apparent power of the circuit.

18. A volt-ampere meter for an alternating-current circuit comprising co-operating windings, one of which is energized in proportion to one of the components of the apparent power of the circuit, means including another of said windings energized from the circuit, and means responsive to only one quantity of the circuit and co-operating with said first means to cause said other winding to be energized in proportion to the other component of the apparent power of the circuit.

In testimony whereof, I have hereunto subscribed my name this 21st day of July, 1920.

CLARENCE A. BODDIE.